United States Patent
Lu

(10) Patent No.: US 10,484,938 B2
(45) Date of Patent: Nov. 19, 2019

(54) ELECTRONIC DEVICES WITH MULTI-CONNECTORS AND METHODS THEREOF

(71) Applicant: Silicon Motion, Inc., Jhubei, Hsinchu County (TW)

(72) Inventor: Liang-Hsuan Lu, Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 132 days.

(21) Appl. No.: 15/389,784

(22) Filed: Dec. 23, 2016

(65) Prior Publication Data
US 2017/0188338 A1   Jun. 29, 2017

(30) Foreign Application Priority Data
Dec. 28, 2015 (TW) .............................. 104143995 A

(51) Int. Cl.
*H04W 48/18* (2009.01)

(52) U.S. Cl.
CPC .................................. *H04W 48/18* (2013.01)

(58) Field of Classification Search
CPC ........ G06F 13/00; H04W 48/18; H04W 88/06
See application file for complete search history.

(56) References Cited

U.S. PATENT DOCUMENTS

| | | | |
|---|---|---|---|
| 6,144,721 A * | 11/2000 | Stephens | H04M 1/24 324/520 |
| 8,898,488 B2 | 11/2014 | Lin | |
| 2002/0169915 A1 | 11/2002 | Wu | |
| 2007/0245058 A1 * | 10/2007 | Wurzburg | G06F 13/4022 710/313 |
| 2008/0140872 A1 | 6/2008 | Wright | |
| 2016/0104943 A1 * | 4/2016 | Ley | H01Q 19/062 343/755 |

(Continued)

FOREIGN PATENT DOCUMENTS

| | | |
|---|---|---|
| CN | 201674624 U | 12/2010 |
| JP | 07-245639 A | 9/1995 |

(Continued)

*Primary Examiner* — Jason E Mattis
*Assistant Examiner* — Nizam U Ahmed
(74) *Attorney, Agent, or Firm* — McClure, Qualey & Rodack, LLP

(57) ABSTRACT

An electronic device includes a first connection interface and a second connection interface configured to be electrically connected to at least one host system, a transmission control device, a data access device, and a channel-detecting device. The transmission control device includes a first communication channel electrically connected to the first connection interface and a second communication channel electrically connected to the second connection interface. The transmission control device determines a connection state according to impedance information and provides corresponding operation functions for at least one host system according to the connection state. The data access device is electrically connected to the transmission control device, and is configured to receive data transmitted by the host system. The channel-detecting device detects the impedance information between one or both of the first connection interface and the second connection interface and the at least one host system.

16 Claims, 10 Drawing Sheets

(56) References Cited

U.S. PATENT DOCUMENTS

2017/0093700 A1* 3/2017 Gilley .................... H04L 45/44

FOREIGN PATENT DOCUMENTS

| KR | 100805835 B1 | 2/2008 |
| KR | 10-2011-0084945 A | 7/2011 |
| TW | 200736912 | 10/2007 |
| TW | 201227311 | 7/2012 |
| TW | I507876 | 11/2015 |

* cited by examiner

ELECTRONIC DEVICES WITH MULTI-CONNECTORS AND METHODS THEREOF

CROSS REFERENCE TO RELATED APPLICATIONS

This Application claims priority of Taiwan Patent Application No. 104143995, filed on Dec. 28, 2015, the entirety of which is incorporated by reference herein.

BACKGROUND OF THE INVENTION

Field of the Invention

The disclosure relates generally to an electronic device, a transmission control device, and a control method thereof, and more particularly it relates to an electronic device with multiple connectors, a transmission control device with multiple connectors, and a control method thereof.

Description of the Related Art

The growth of digital cameras, mobile phones, and MP3 players has been rapid in recent years. Generally, a flash drive includes only one connector to connect to a host system. When the connector is connected to a host system, the host system may access data stored in the flash drive through a connection interface unit of the flash drive.

However, most connection interfaces nowadays are based on the Universal Serial Bus (USB) specification. For the sake of providing users with more diversity, the connection interface may include multiple connectors, such that different host systems can access the same device at the same time. Using this architecture in the connection interface, the transmission control device of the electronic device, which has the function of storing data that is able to be accessed, should determine that either of the connectors has been electrically connected to a host system. That is, the transmission control device determines that the signals provided by the host systems are transmitted through either of the connectors to the electronic device.

In addition, after determining that one of the connectors is electrically connected to a host system, the transmission control device of the electronic device should also provide different operation functions for different host systems, so that user demands for diversity can be satisfied. However, so far the prior art teaches nothing about a method for controlling an electronic device with multiple connectors.

BRIEF SUMMARY OF THE INVENTION

In an embodiment, an electronic device comprises a first connection interface and a second connection interface configured to be electrically connected to at least one host system, a transmission control device, a data access device, and a channel-detecting device. The transmission control device comprises a first communication channel and a second communication channel. The first connection interface is electrically connected to the first communication channel, and the second connection interface is electrically connected to the second communication channel. The transmission control device determines the connection state according to impedance information and provides corresponding operation functions for the host system according to the connection state. The data access device is electrically connected to the transmission control device and configured to receive data transmitted by the host system. The channel-detecting device detects the impedance information between one or both of the first connection interface and the second connection interface and the at least one host system.

According to an embodiment of the invention, the corresponding operation functions provided by the transmission control device comprises at least one of a multimedia access function, a data input/output interface function, and an information security certification function.

According to an embodiment of the invention, the channel-detecting device generates the impedance information according to at least one impedance value of the host system electrically connected to one or both of the first connection interface and the second connection interface. The connection state indicates whether one or both of the first connection interface and the second connection interface is electrically connected to the host system.

According to an embodiment of the invention, when the transmission control device determines that at least one host system is electrically connected to the first connection interface and the second connection interface according to the connection state, the transmission control device declares that the data access device that the at least one host system is electrically connected to is identical and provides the corresponding operation functions for the host system. The different operation functions provided by the transmission control device comprise different operation authorities for the data access device.

According to an embodiment of the invention, the first communication channel comprises a first transmitting channel and a first receiving channel, and the second communication channel comprises a second transmitting channel and a second receiving channel. The channel-detecting device generates an impedance signal according to at least one voltage variation generated by at least one terminal impedance of the host system electrically connected to the first connection interface and the second connection interface, and the transmission control device determines the connection state according to the impedance signal.

According to an embodiment of the invention, the first communication channel further comprises a first power bus and the second communication channel further comprises a second power bus. The transmission control device provides electricity for the data access device through the first power bus and/or the second power bus.

According to an embodiment of the invention, when the at least one host system is electrically connected to the first communication channel or the second communication channel, the first transmission channel or the second communication channel is electrically connected to at least one receiving channel of the host system through a coupling capacitor. The channel-detecting device comprises: a bias circuit, a current source, a comparator, and a latch circuit. The bias circuit biases the first transmission channel or the second transmission channel to a bias voltage. The current source sources a current to the first transmitting channel or the second transmitting channel during a predetermined period according to a control signal. The comparator compares the bias voltage with a middle voltage to generate a comparison signal. The latch circuit latches the comparison signal as the impedance signal once the predetermined period ends. The transmission control device determines the connection state according to the impedance signal.

According to an embodiment of the invention, when the first transmitting channel or the second transmitting channel is electrically connected to the terminal impedance of the host system, the bias voltage is charged by the current to exceed the middle voltage. When the first transmitting channel or the second transmitting channel is not electrically connected to the terminal impedance of the host system, the bias voltage does not exceed the middle voltage during the predetermined period.

According to an embodiment of the invention, the channel-detecting device respectively detects the first transmitting channel and the second transmitting channel at different times.

According to an embodiment of the invention, the electronic device further comprises another channel-detecting device. When the channel-detecting device detects the impedance information of the first transmitting channel or the second transmitting channel, the other channel-detecting device detects the impedance information of the other of the first transmitting channel and the second transmitting channel at the same time.

According to an embodiment of the invention, the transmission control device comprises a register storing setting parameters. When a first host system is electrically connected to the first connection interface and the second host system is electrically connected to the second connection interface, the transmission control device operates, according to the setting parameters, in an auto mode, a priority mode, a maintenance mode, or a custom mode to permit one or both of the first host system and the second host system to operate the corresponding operation functions on the data access device.

According to an embodiment of the invention, when the transmission control device operates in the auto mode, the transmission control device permits the first host system or the second host system to operate the corresponding operation functions on the data access device according to the order in which the first host system and the second host system are electrically connected to the first connection interface and the second connection interface respectively.

According to another embodiment of the invention, when the transmission control device operates in the priority mode, the setting parameters further comprise a priority. The transmission control device preferentially permits the first host system or the second host system to operate the corresponding operation functions on the data access device in order of the priority.

According to yet another embodiment of the invention, when the transmission control device operates in the maintenance mode, the transmission control device grants a sleep request from the first host system or the second host system to enter a sleep mode. The transmission control device merely grants a wake-up request from the first host system or the second host system that made the sleep request and permits the first host system or the second host system that made the sleep request to operate the corresponding operation functions on the data access device.

According to yet another embodiment of the invention, when the transmission control device operates in the custom mode, the setting parameters further comprise access logic. The transmission control device permits one or both of the first host system and the second host system to operate the corresponding operation functions on the data access device according to the access logic.

According to an embodiment of the invention, the data access device is a USB rewritable non-volatile memory device, a USB multi-media device, a USB hard disc, a USB optic disk drive, a USB keyboard, a USB card reader, or a USB Wi-Fi adapter.

In an embodiment, a transmission control device for controlling a data access device comprises a host interface, a device interface, and a data-management circuit. The host interface comprises a first communication channel and a second communication channel. The first communication channel is electrically connected to a first connection interface and the second communication channel is electrically connected to a second connection interface. The first connection interface and the second connection interface are electrically connected to at least one host system. The device interface is configured to be electrically connected to the data access device. The data-management circuit is electrically connected to the host interface and the device interface. A channel-detecting device detects impedance information between one or both of the first connection interface and the second connection interface and the at least one host system. The data-management circuit determines the connection state according to the impedance information and provides corresponding operation functions for the host system according to the connection state.

According to an embodiment of the invention, the corresponding operation functions provided by the data management device comprises at least one of a multimedia access function, a data input/output interface function, and an information security certification function.

According to an embodiment of the invention, the data-management circuit generates the impedance information according to at least one impedance value of the host system electrically connected to one or both of the first connection interface and the second connection interface. The connection state indicates whether one or both of the first connection interface and the second connection interface is electrically connected to the host system.

According to an embodiment of the invention, when the transmission control device determines that at least one host system is electrically connected to the first connection interface and the second connection interface according to the connection state, the transmission control device declares that the data access device that the at least one host system is electrically connected to is identical and provides the corresponding operation functions for the host system. The different operation functions provided by the transmission control device comprise different operation authorities for the data access device.

According to an embodiment of the invention, the first communication channel comprises a first transmitting channel and a first receiving channel, and the second communication channel comprises a second transmitting channel and a second receiving channel. The channel-detecting device generates an impedance signal according to at least one voltage variation generated by at least one terminal impedance of the host system electrically connected to the first connection interface and the second connection interface, and the data-management circuit determines the connection state according to the impedance signal.

According to an embodiment of the invention, the first communication channel further comprises a first power bus and the second communication channel further comprises a second power bus. The data-management circuit provides electricity for the data access device through the first power bus and/or the second power bus.

According to an embodiment of the invention, when the at least one host system is electrically connected to the first communication channel or the second communication channel, the first transmission channel or the second communication channel is electrically connected to at least one receiving channel of the host system through a coupling capacitor. The channel-detecting device comprises: a bias circuit, a current source, a comparator, and a latch circuit.

The bias circuit biases the first transmission channel or the second transmission channel to a bias voltage. The current source sources a current to the first transmitting channel or the second transmitting channel during a predetermined period according to a control signal. The comparator compares the bias voltage with a middle voltage to generate a comparison signal. The latch circuit latches the comparison signal as the impedance signal once the predetermined period ends. The transmission control device determines the connection state according to the impedance signal.

According to an embodiment of the invention, when the first transmitting channel or the second transmitting channel is electrically connected to the terminal impedance of the host system, the bias voltage is charged by the current to exceed the middle voltage. When the first transmitting channel or the second transmitting channel is not electrically connected to the terminal impedance of the host system, the bias voltage does not exceed the middle voltage during the predetermined period.

According to an embodiment of the invention, the channel-detecting device respectively detects the first transmitting channel and the second transmitting channel at different times.

According to an embodiment of the invention, when the channel-detecting device detects the impedance information of the first transmitting channel or the second transmitting channel, another channel-detecting device detects the impedance information of the other of the first transmitting channel and the second transmitting channel at the same time.

According to an embodiment of the invention, the data-management circuit comprises a register storing setting parameters. When a first host system is electrically connected to the first connection interface and the second host system is electrically connected to the second connection interface, the data-management circuit operates, according to the setting parameters, in an auto mode, a priority mode, a maintenance mode, or a custom mode to permit one or both of the first host system and the second host system to operate the corresponding operation functions on the data access device.

According to an embodiment of the invention, when the data-management circuit operates in the auto mode, the data-management circuit permits the first host system or the second host system to operate the corresponding operation functions on the data access device according to the order in which the first host system and the second host system are electrically connected to the first connection interface and the second connection interface respectively.

According to another embodiment of the invention, when the data-management circuit operates in the priority mode, the setting parameters further comprise a priority. The data-management circuit preferentially permits the first host system or the second host system to operate the corresponding operation functions on the data access device in order of the priority.

According to yet another embodiment of the invention, when the data-management circuit operates in the maintenance mode, the data-management circuit grants a sleep request from the first host system or the second host system to enter a sleep mode. The data-management circuit merely grants a wake-up request from the first host system or the second host system that made the sleep request and permits the first host system or the second host system that made the sleep request to operate the corresponding operation functions on the data access device.

According to yet another embodiment of the invention, when the data-management circuit operates in the custom mode, the setting parameters further comprise access logic. The data-management circuit permits one or both of the first host system and the second host system to operate the corresponding operation functions on the data access device according to the access logic.

According to an embodiment of the invention, the data access device is a USB rewritable non-volatile memory device, a USB multi-media device, a USB hard disc, a USB optic disk drive, a USB keyboard, a USB card reader, or a USB Wi-Fi adapter.

In an embodiment, a control method for controlling an electronic device, in which the electronic device comprises a first connection interface, a second connection interface, and a data access device, in which the first connection interface and the second connection interface are configured to be electrically connected to at least one host system, the control method comprises: detecting impedance information between one or both of the first connection interface and the second connection interface and the at least one host system to generate an impedance signal by at least one channel-detecting device; determining the connection state of one or both of the first connection interface and the second connection interface and the at least one host system according to impedance information and providing corresponding operation functions for the host system according to the impedance signal; and providing corresponding operation functions for the host system according to the connection state.

According to an embodiment of the invention, the corresponding operation functions provided by the transmission control device comprises at least one of a multimedia access function, a data input/output interface function, and an information security certification function.

According to an embodiment of the invention, the impedance information is generated according to at least one impedance value of the host system electrically connected to one or both of the first connection interface and the second connection interface. The connection state indicates whether one or both of the first connection interface and the second connection interface is electrically connected to the host system.

According to an embodiment of the invention, when determining that at least one host system is electrically connected to the first connection interface and the second connection interface according to the connection state, the data access device that the at least one host system is electrically connected to is declared to be identical and the corresponding operation functions provided for the host system. The different operation functions comprise different operation authorities for the data access device.

According to an embodiment of the invention, the impedance signal is generated according to at least one voltage variation generated by at least one terminal impedance of the host system electrically connected to the first connection interface and the second connection interface.

According to an embodiment of the invention, the control method further comprises providing electricity for the data access device through the first power bus of the first connection interface and/or the second power bus of the second connection interface.

According to an embodiment of the invention, when the at least one host system is electrically connected to the first communication channel or the second communication channel, the first transmission channel or the second communication channel is electrically connected to at least one receiving channel of the host system through a coupling capacitor. The step of detecting the impedance information between one or both of the first connection interface and the second connection interface and the at least one host system to generate the impedance signal by at least one channel-detecting device comprises: biasing the first transmission channel or the second transmission channel to a bias voltage; sourcing a current to the first transmitting channel or the second transmitting channel during a predetermined period according to a control signal; comparing the bias voltage with a middle voltage to generate a comparison signal; and latching the comparison signal as the impedance signal once the predetermined period ends.

According to an embodiment of the invention, when the first transmitting channel or the second transmitting channel is electrically connected to the terminal impedance of the host system, the bias voltage is charged by the current to exceed the middle voltage. When the first transmitting channel or the second transmitting channel is not electrically connected to the terminal impedance of the host system, the bias voltage does not exceed the middle voltage during the predetermined period.

According to an embodiment of the invention, the first transmitting channel and the second transmitting channel are detected by the channel-detecting device at different times.

According to an embodiment of the invention, when the impedance information of the first transmitting channel or the second transmitting channel is detected by the channel-detecting device, the impedance information of the other of the first transmitting channel and the second transmitting channel is detected by another channel-detecting device at the same time.

According to an embodiment of the invention, the control method further comprises: operating in an auto mode, a priority mode, a maintenance mode, or a custom mode according to setting parameters stored in a register when a first host system is electrically connected to the first connection interface and the second host system is electrically connected to the second connection interface; and permitting one or both of the first host system and the second host system to operate the corresponding operation functions on the data access device according to the auto mode, the priority mode, the maintenance mode, or the custom mode.

According to an embodiment of the invention, the control method further comprises: operating in the auto mode; and permitting the first host system or the second host system to operate the corresponding operation functions on the data access device according to the order in which the first host system and the second host system are electrically connected to the first connection interface and the second connection interface respectively.

According to another embodiment of the invention, the control method further comprises: operating in the priority mode; and preferentially permitting the first host system or the second host system to operate the corresponding operation functions on the data access device according to the order of the priority of the setting parameters.

According to yet another embodiment of the invention, the control method further comprises: operating in the maintenance mode; granting a sleep request from the first host system or the second host system to enter a sleep mode; and merely granting a wake-up request from the first host system or the second host system that made the sleep request and permitting the first host system or the second host system that made the sleep request to operate the corresponding operation functions on the data access device.

According to yet another embodiment of the invention, the control method further comprises: operating in the custom mode; and permitting one or both of the first host system and the second host system to operate the corresponding operation functions on the data access device according to access logic of the setting parameters.

According to an embodiment of the invention, the data access device is a USB rewritable non-volatile memory device, a USB multi-media device, a USB hard disc, a USB optic disk drive, a USB keyboard, a USB card reader, or a USB Wi-Fi adapter.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
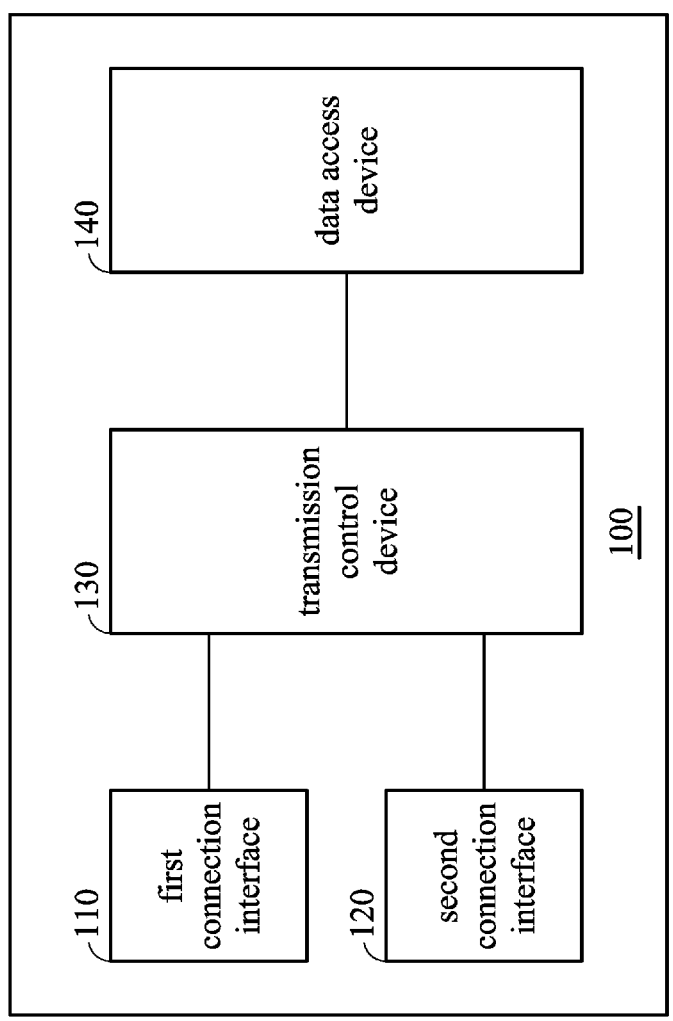
FIG. 1 is a block diagram of an electronic device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of an electronic device in accordance with an embodiment of the invention. As shown in FIG. 1, the electronic device 100 includes the first connection interface 110, the second connection interface 120, the transmission control device 130, and the data access device 140. Each of the first connection interface 110 and the second connection interface 120 includes a connector, in which the electronic device 100 is electrically connected to one or a plurality of the same, or different, types of host systems. According to an embodiment of the invention, the electronic device 100 may include a plurality of connection interfaces and a plurality of connectors. The first connection interface 110 and the second connection interface 120 are illustrated herein.

According to an embodiment of the invention, the first connection interface 110 and the second connection interface 120 are at least compatible with a Universal Serial Bus (USB) standard. Nevertheless, it should be understood that the invention is not limited thereto. The first connection interface 110 and the second connection interface 120 may also be compatible with a Parallel Advanced Technology Attachment (PATA) standard, an Institute of Electrical and Electronic Engineers (IEEE) 1394 standard, a peripheral component interconnect (PCI) Express interface standard, a Serial Advanced Technology Attachment (SATA) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard, or another suitable standard.

The first connection interface 110 and the second connection interface 120 may be packaged into one chip together with the transmission control device 130, or the first connection interface 110 and the second connection interface 120 are placed outside of a chip containing the transmission control device 130. In an exemplary embodiment where the electronic device includes multi-connectors, interface standards to which at least one connection interface is compatible with may be completely the same, partially the same, or completely different. For example, the interface standards of the first connection interface 110 and the second connection interface 120 may both be compatible with Second Generation Universal Serial Bus (USB 2.0) standard, or they may both be compatible with Third Generation Universal Serial Bus (USB 3.0) standard. Alternatively, one the first connection interface 110 and the second connection interface 120 is compatible with USB 2.0 standard while the other one is compatible with USB 3.0 standard. Alternatively, the interface standards of the first connection interface 110 and the second connection interface 120 may also be a combination of two among the aforementioned interface standards.

The transmission control device 130 is configured to execute a plurality of logic gates or control commands which are implemented in a hardware form or in the form of firmware, so as to perform operations of transmitting and receiving data in the data access device 140 according to the commands of at least one host system that the first connection interface 110 and the second connection interface 120 are electrically connected to.

The data access device 140 is electrically connected to the transmission control device 130 and configured to receive data transmitted from at least one host system that one or both of the first connection interface 110 and the second connection interface 120 is electrically connected to. The data access device 140 is also configured to transmit data to at least one host system that one or both of the first connection interface 110 and the second connection interface 120 is electrically connected to.

According to an embodiment of the invention, when the data access device 140 is a storage media, the transmission control device 130 further performs an operation of erasing data in the data access device 140 according to the commands of at least one host system that the first connection interface 110 and the second connection interface 120 are electrically connected to. According to other embodiments of the invention, the data access device 140 is a USB rewritable non-volatile memory device, a USB multi-media device, a USB hard disc, a USB optic disk drive, a USB keyboard, a USB card reader, a USB Wi-Fi adapter, or any other device that allows a host system to access data.

Figure 2:
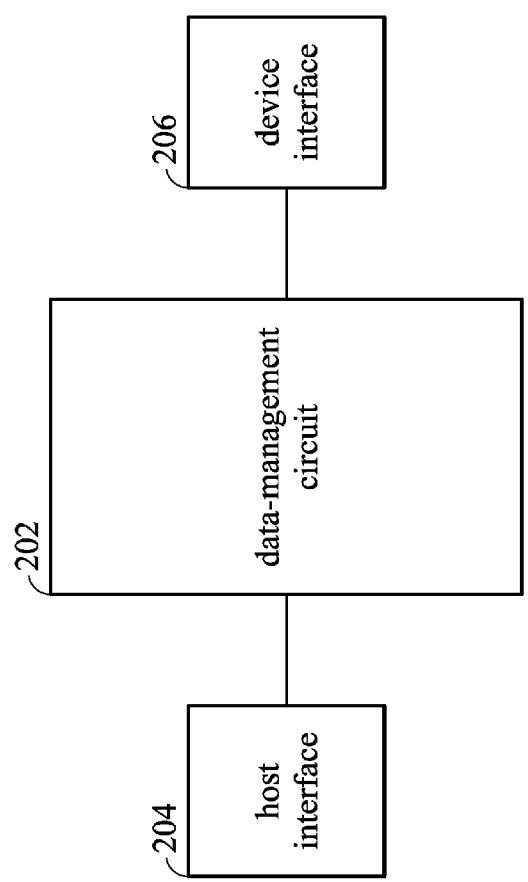
FIG. 2 is a block diagram of the transmission control device in FIG. 1 in accordance with an embodiment of the invention.

FIG. 2 is a block diagram of the transmission control device in FIG. 1 in accordance with an embodiment of the invention. As shown in FIG. 2, the transmission control device 130 includes a data-management circuit 202, a host interface 204, and a device interface 206. The data-management circuit 202 is configured to control the overall operations of the data access device 140. Specifically, the data-management circuit 202 has a plurality of control commands. During operations of the electronic device 100, the control commands are executed to perform various operations such as writing, reading and erasing data. The operations of the data-management circuit 202 are similar to the operations of the data access device 140, thus a related description is omitted herein.

According to an embodiment of the invention, the control commands of the data-management circuit 202 are implemented in the form of firmware. For instance, the data-management circuit 202 includes a register (not shown in FIG. 2), and the control commands of the data-management circuit 202 are stored in the register in the form of firmware. In addition, the data-management circuit 202 further includes a microprocessor unit (not shown in FIG. 2), and the microprocessor performs the operations of writing, reading or erasing data according to the control commands stored in the ROM. According to another embodiment of the invention, the control commands of the data-management circuit 202 may also be implemented a form of hardware.

The host interface 204 is electrically connected to the data-management circuit 202 and configured to receive and identify commands and data sent from the host system. Namely, the commands and data sent from at least one host system that one or both of the first connection interface 110 and the second connection interface 120 is electrically connected to are passed to the data-management circuit 202 through the host interface 204. According to an embodiment of the invention, the host interface 204 is compatible with a SATA standard. However, it should be understood that the present invention is not limited thereto, and the host interface 204 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or another suitable standard for data transmission.

In the electronic device 100 including a plurality of connection interfaces, an exemplary example of the host interface 204 may be one or more host interfaces which are electrically connected to the data-management circuit 202, and configured to, separately or together, receive and identify commands and data sent from at least one host system that one or both of the first connection interface 110 and the second connection interface 120 is electrically connected to. According to an embodiment of the invention, the transmission control device 130 may include one or a plurality of communication channels. In an exemplary embodiment where one single communication channel is included, the communication channel may be disposed in the host interface 204. In an exemplary embodiment where a plurality of communication channels are included, the communication channels may all be disposed in the host interface 204, or may be disposed one by one in a plurality of host systems, respectively.

The device interface 206 is electrically connected to the data-management circuit 202 and configured to access the data access device 140. That is, data to be written to the data access device 140 is converted to a format that is acceptable to the data access device 140 through the device interface 206, and data transmitted by the data access device 140 is also converted to a format that is acceptable to the at least one host system that one or both of the first connection interface 110 and the second connection interface 120 is electrically connected to.

Figure 3:
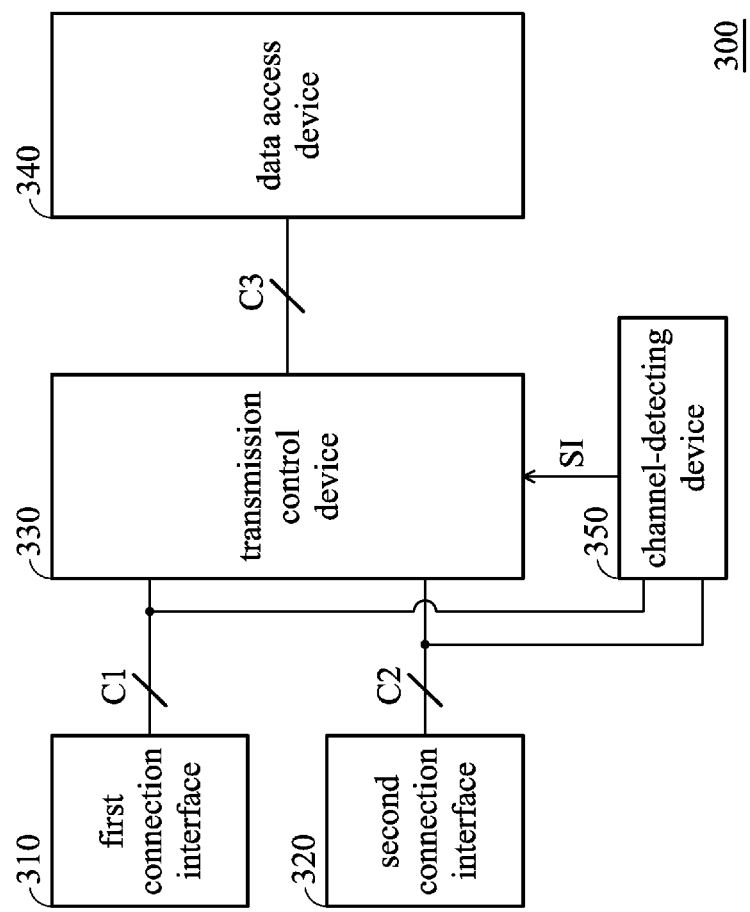
FIG. 3 is a block diagram of an electronic device in accordance with another embodiment of the invention.

FIG. 3 is a block diagram of an electronic device in accordance with another embodiment of the invention. As shown in FIG. 3, the electronic device 300 includes a first connection interface 310, a second connection interface 320, a transmission control device 330, a data access device 340, and a channel-detecting device 350. Compared with the electronic device 100 in FIG. 1, the electronic device 300 further includes the channel-detecting device 350.

The transmission control device 330 is electrically connected to the first connection interface 310 through the first communication channel C1, electrically connected to the second connection interface 320 through the second communication channel C2, and electrically connected to the data access device 340 through the third communication channel C3. It should be noted that, in the architecture of the electronic device 300 in accordance with an embodiment of the invention, each of the first connection interface 310 and the second connection interface 320 includes a connector and the connectors are configured to at least one host system.

According to an embodiment of the invention, the first connection interface 310 and the second connection interface 320 are configured to be electrically connected to the at least one host system by using the included connectors. Therefore, a connection state between the host system and the first connection interface 310 and the second connection interface 320 includes (but not limited to) following differences: the first connection interface 310 is electrically connected to one host system, and the second connection interface 320 is not connected to any host system; the first connection interface 310 is not connected to any host system, and the second connection interface 320 is electrically connected to one host system; the first connection interface 310 is electrically connected to a first host system, and the second connection interface 320 is connected to a second host system; and the first connection interface 310 and the second connection interface 320 are electrically connected to the same host system.

The channel-detecting device 350 is electrically connected to the first communication channel C1 and the second communication channel C2, which is configured to detect the impedance information between one or both of the first connection interface 310 and the second connection interface 320 and at least one host system to generate an impedance signal SI. The transmission control device 330 determines the connection state according to the impedance information of the impedance signal SI, in which the connection state indicates whether at least one host system is electrically connected to one or both of the first connection interface 310 and the second connection interface 320.

According to an embodiment of the invention, the transmission control device 330 provides different operation functions corresponding to the first connection interface 310 and the second connection interface 320 for the electrically connected host systems according to a connection state indicating whether at least one host system is electrically connected to one or both of the first connection interface 310 and the second connection interface 320. It should be understood that the host system electrically connected to the first connection interface 310 and/or the second connection interface 320 may be one or more identical or different host systems. In other words, if the first connection interface 310 is electrically connected to the first host system, the transmission control device 330 is configured to provide a first operation function to the first host system. If the second connection interface 320 is electrically connected to the second host system, the transmission control device 330 is configured to provide a second operation function to the second host system, in which the first operation function and the second operation function are different. Therefore, the transmission control device 330 is capable of providing the different operation functions to the electrically connected host system according to the connection state between the host system and the first connection interface 310 and/or the second connection interface 320.

For instance, according to the host system electrically connected to one or both of the first connection interface 310 and the second connection interface 320, the transmission control device 330 declares that the data access device 340 that the host system is electrically connected to is different and provides the different operation functions to the connected host system. The types of electronic devices that can be designated by the transmission control device 330 include, but are not limited to, a USB disk drive, a USB optical disk drive, a USB keyboard, a USB card reader, a USB Wi-Fi adapter, and any other device that allows a host system to access data. Therefore, as in correspondence to the host system(s) electrically connected to the first connection interface 310 and/or the second connection interface 320, the different operation functions provided by the transmission control device 330 include a multimedia access function, a data input/output interface function, and/or an information security certification function. The information security certification function is, for example, a password authentication function required when the electronic device 300 is electronically connecting to the corresponding host system. Furthermore, according to an embodiment of the invention, when the first connection interface 310 and the second connection interface 320 are electrically connected to the same host system, or electrically connected to different host systems, the transmission control device 330 may also declare that the data access device 340 that the host system(s) is/are electrically connected to is different, and provide different operation functions for the connected host system(s) individually coupled to the first connection interface 310 and the second connection interface 320.

According to an embodiment of the invention, the differences in the connection state among the host system(s), the first connection interface 310 and the second connection interface 320 may further include the first connection interface 310 and the second connection interface 320 being electrically connected to the same or different host system(s). In this embodiment, the transmission control device 330 declares that the data access device 340 that the host system(s) is/are electrically connected to is identical, and provides the different operation functions to the host system(s) electrically connected to the first connection interface 310 and the second connection interface 320. The different operation functions provided by the transmission control device 330 include different operation authorities for the data access device 340, such as different speed to access Internet or different priority permissions for the host system(s) connected to the first connection interface 310 and the second connection interface 320 when the data access device 340 is a Wi-Fi adapter.

In other words, the transmission control device 330 is capable providing different functions to correspond to the host system(s) electrically connected to the different connection interfaces. Herein, the different functions include declaring the electronic device 300 that the host system(s) is/are electrically connected to is different, and declaring the electronic device 300 that the host system(s) is/are electrically connected to is identical but the operational authorities for the host system(s) may be different.

According to an embodiment of the invention, the first connection interface 310 and the second connection interface 320 may all be compatible with the same transmission interface standard; according to another embodiment of the invention, the first connection interface 310 or the second connection interface 320 is compatible with a first transmission interface standard while the other is compatible with a second transmission interface standard, in which the first transmission interface standard and the second transmission interface standard are different. For instance, the first connection interface 310 and the second connection interface 320 are both compatible with the transmission interface standard of USB 2.0 or both compatible with the transmission interface standard of USB 3.0. Alternatively, the first connection interface 310 or the second connection interface 320 may be compatible with the transmission interface standard of USB 1.1, while the other may be compatible with the transmission interface standard of the SATA standard. Alternatively, the first connection interface 310 or the second connection interface 320 may be compatible with the transmission interface standard of USB 2.0, while the other may be compatible with the transmission interface standard of the USB 3.0. Alternatively, the first connection interface 310 or the second connection interface 320 may be compatible with the transmission interface standard of USB 3.1 Type-C, while the other may be, for example, compatible with the transmission interface standard of the USB 3.1 Type-A. In other words, the transmission interface standards that the first connection interface 310 and the second connection interface 320 are compatible with are not particularly limited in the invention.

According to an embodiment of the invention, the first connection interface 310 and the second connection interface 320 may be packaged into one chip together with the transmission control device 330 and the channel-detecting device 350, or the first connection interface 310 and the second connection interface 320 are placed outside of a chip containing the transmission control device 330 and the channel-detecting device 350.

Figure 4:
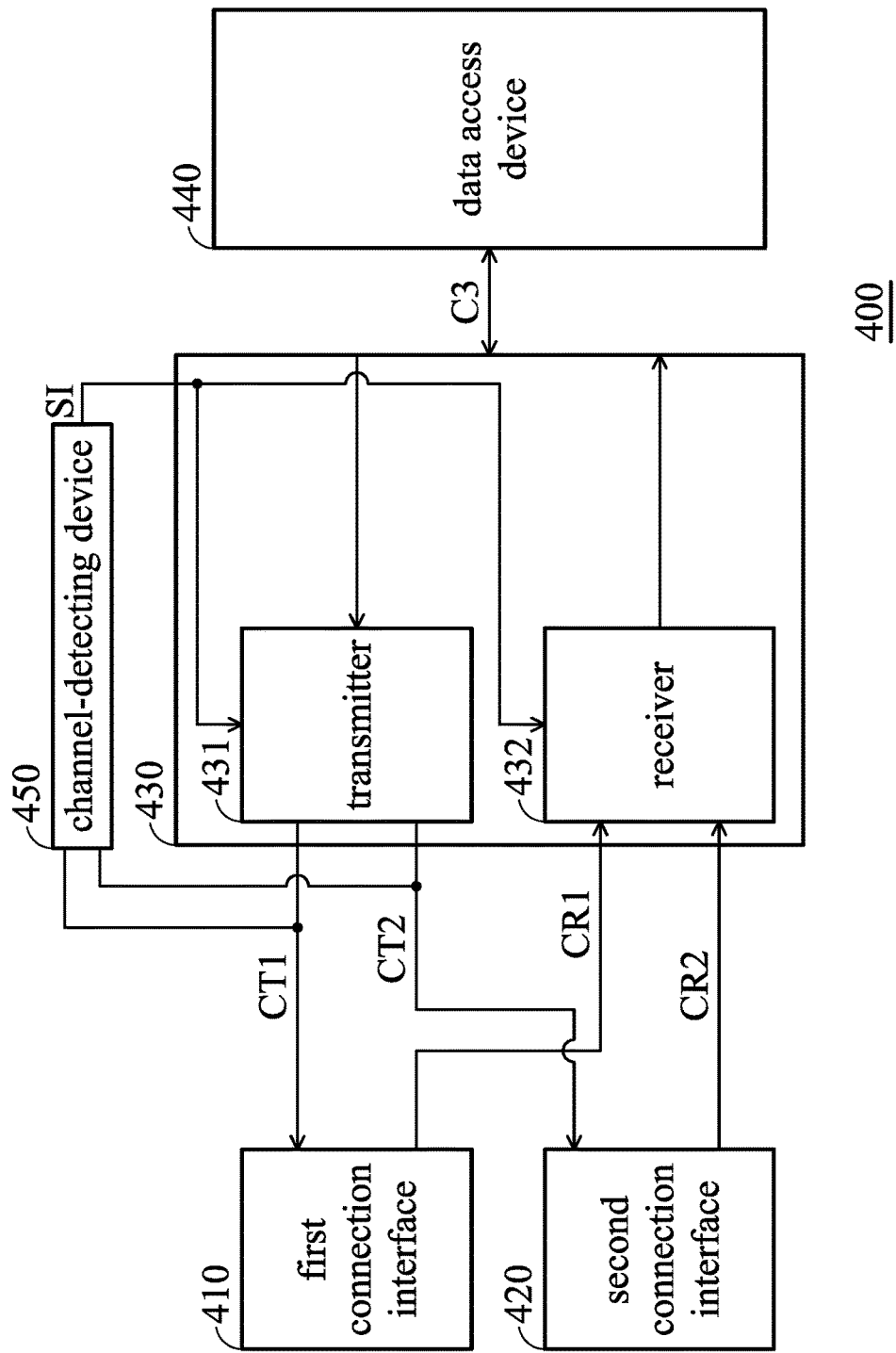
FIG. 4 is a block diagram of the transmission control device in FIG. 3 in accordance with an embodiment of the invention.

FIG. 4 is a block diagram of the transmission control device in FIG. 3 in accordance with an embodiment of the invention. As shown in FIG. 4, the electronic device 400 is identical to the electronic device 300 in FIG. 3, which includes the first connection interface 410, the second connection interface 420, the transmission control device 430, the data access device 440, and the channel-detecting device 450. According to an embodiment of the invention, the data access device 440 further includes a transmitter 431 and a receiver 432. The first communication channel C1 in FIG. 3 includes the first transmitting channel CT1 and the first receiving channel CR1, while the second communication channel C2 includes the second transmitting channel CT2 and the second receiving channel CR2.

As shown in FIG. 4, the channel-detecting device 450 is electrically connected to the first transmitting channel CT1 and the second transmitting channel CT2, and configured to detect the impedance information about whether one or both of the first connection interface 410 and the second connection interface 420 is electrically connected to at least one host system to generate the impedance signal SI. For instance, when the first connection interface 410 is electrically connected to a host system, the first transmitting channel CT1 is electrically connected to the receiving channel of the host system. Therefore, the channel-detecting device 450 determines whether the first connection interface 410 is electrically connected to a host system according to whether the first transmitting channel CT1 is electrically connected to the terminal impedance of the receiving channel of the host system.

According to an embodiment of the invention, when the channel-detecting device 450 detects that the first transmitting channel CT1 is electrically connected to a terminal impedance, it means that the first connection interface 410 is electrically connected to a host system. According to another embodiment of the invention, when the channel-detecting device 450 detects that the first transmitting channel CT1 is in the floating state (i.e., the terminal impedance to which the first transmitting channel CT1 is electrically connected is infinite), it means that the first connection interface 410 is not electrically connected to a host system. Therefore, the transmission control device 430 is capable of determining whether one or both of the first connection interface 410 and the second connection interface 420 is electrically connected to at least one host system, according to the impedance information of the impedance signal SI.

When the transmission control device 430 receives the impedance signal SI, the transmitter 431 transmits the data from the data access device 440 through one or both of the first transmitting channel CT1 and the second transmitting channel CT2 according to the impedance signal SI, and the receiver 432 receives the commands and data from the first connection interface 410 or the second connection interface 420 through one or both of the first receiving channel CR1 and the second receiving channel CR2 to operate the data access device 440.

According to an embodiment of the invention, when the channel-detecting device 450 detects that only the first connection interface 410 is electrically connected to a host system, that only the second connection interface 420 is electrically connected to a host system, or that each of the first connection interface 410 and the second connection interface 420 is electrically connected to a host system, the transmission control device 430 provides different operation functions for the host system(s) electrically connected to the first connection interface 410 or the second connection interface 420 according to the setting parameters stored in a register (not shown), and the detailed description will be explained in the following paragraphs.

According to an embodiment of the invention, the first transmitting channel CT1 and the second transmitting channel CT2 are formed a differential channel. That is, the first transmitting channel CT1 includes the first transmitting positive terminal CTP1 and the first transmitting negative terminal CTN1, while the second transmitting channel CT2 includes the second transmitting positive terminal CTP2 and the second transmitting negative terminal CTN2. Similarly, the first receiving channel CR1 includes the first receiving positive terminal CRP1 and the first receiving negative terminal CRN1, while the second receiving channel CR2 includes the second receiving positive terminal CRP2 and the second receiving negative terminal CRN2. Since each of the transmitting positive terminal and the transmitting negative terminal is electrically connected to a terminal impedance of a host system when the first connection interface 410 or the second connection interface 420 is electrically connected to at least one host system, the channel-detecting device 450 is capable of determining the impedance state, by detecting only one of either the transmitting positive terminal or the transmitting negative terminal, to generate the impedance signal SI. The channel-detecting device 450 detecting the impedance state of either the transmitting positive terminal or the transmitting negative terminal will be described in the following paragraph.

Figure 5:
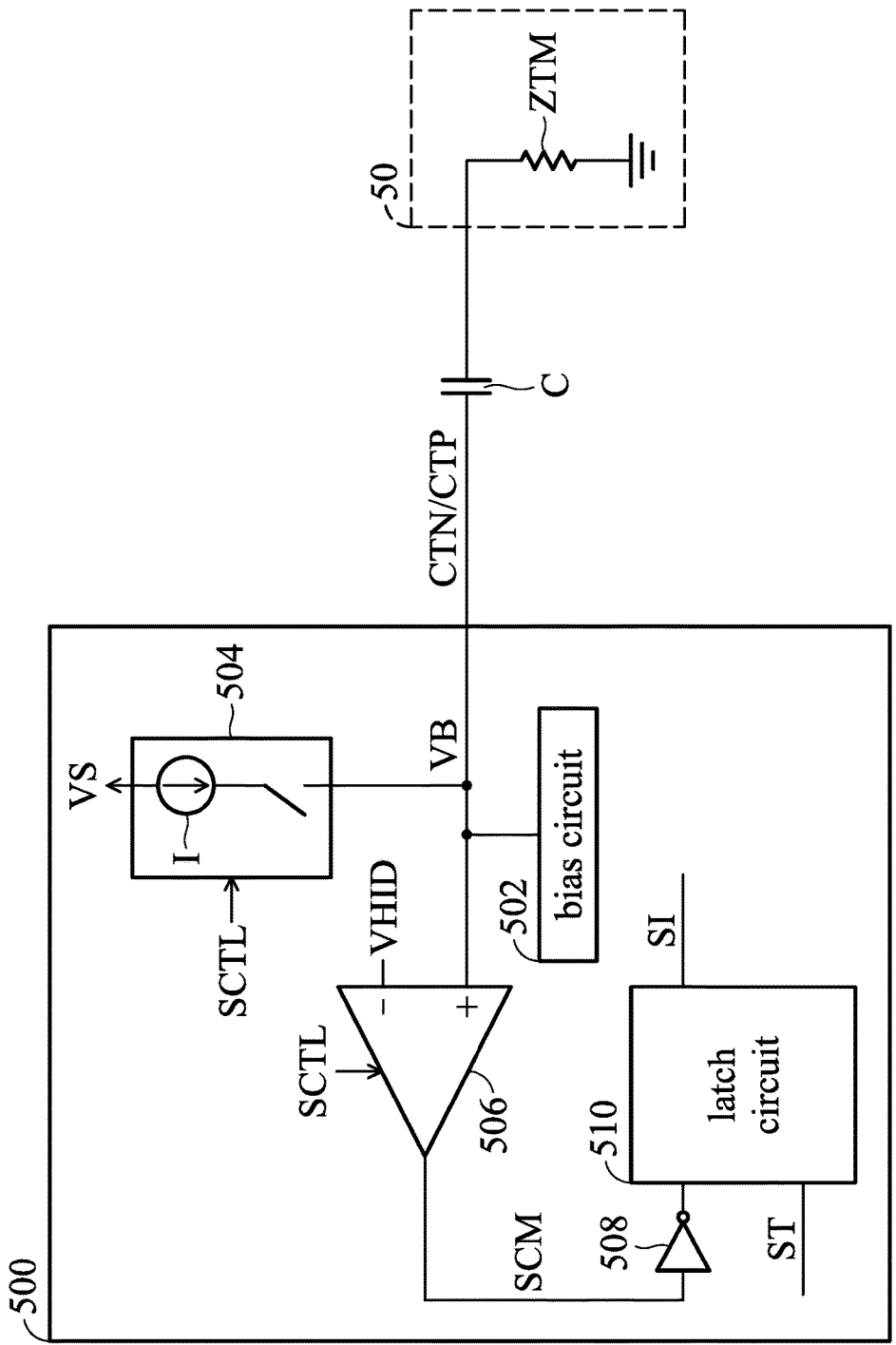
FIG. 5 is a schematic diagram of the channel-detecting device in accordance with an embodiment of the invention.

FIG. 5 is a schematic diagram of the channel-detecting device in accordance with an embodiment of the invention. As shown in FIG. 5, when the host system 50 is electrically connected to the first connection interface 410 or the second connection interface 420, the transmitting positive terminal CTP or the transmitting negative terminal CTN of the first transmitting channel CT1 or the second transmitting channel CT2 is electrically connected to the terminal impedance ZTM of the host system 50 with the coupling capacitor C. As stated above, the channel-detecting device 500 may detect whether the terminal impedance ZTM of the host system 50 is electrically connected to the transmitting positive terminal CTP or the transmitting negative terminal CTN of the first transmitting channel CT1 or the second transmitting channel CT2.

According to an embodiment of the invention, when the transmitting positive terminal CTP of the channel-detecting device 500 is electrically connected, the channel-detecting device 500 detects the terminal impedance ZTM of the receiving positive terminal CRP of the host system 50. According to another embodiment of the invention, when the transmitting negative terminal CTN of the channel-detecting device 500 is electrically connected, the channel-detecting device 500 detects the terminal impedance ZTM of the receiving negative terminal CRN of the host system 50. According to other embodiments of the invention, the channel-detecting device 500 may detect both of the transmitting positive terminal CTP and the transmitting negative terminal CTN at the same time.

As shown in FIG. 5, the channel-detecting device 500 includes a bias circuit 502, a current source 504, a comparator 506, an inverter 508, and a latch circuit 510. The bias circuit 502 is configured to bias the transmitting positive terminal CTP or the transmitting negative terminal CTN to the bias voltage VB. The current source 504 is configured to be electrically connected between the supply voltage VS and either the transmitting positive terminal CTP or the transmitting negative terminal CTN, and to source the current I to the transmitting positive terminal CTP or the transmitting negative terminal CTN according to the control signal SCTL. According to an embodiment of the invention, the current I is generated by a current source or a resistor.

The comparator 506 compares the bias voltage VB of the transmitting positive terminal CTP or the transmitting negative terminal CTN with the middle voltage VMID to generate the comparison signal SCM. The latch circuit 510 latches a signal, which is generated by the inverter 508 inverting the comparison signal SCM, as the impedance signal SI according to the trigger signal ST. According to an embodiment of the invention, the control signal SCTL is generated by the transmission control device 430 in FIG. 4, which is not shown in FIG. 5. For the sake of explaining the invention in detail, the comparison signal SCM is inverted by the inverter 508. One skilled in the art will understand how to combine the behaviors of the inverter 508 and the comparator 506.

Figure 6A:
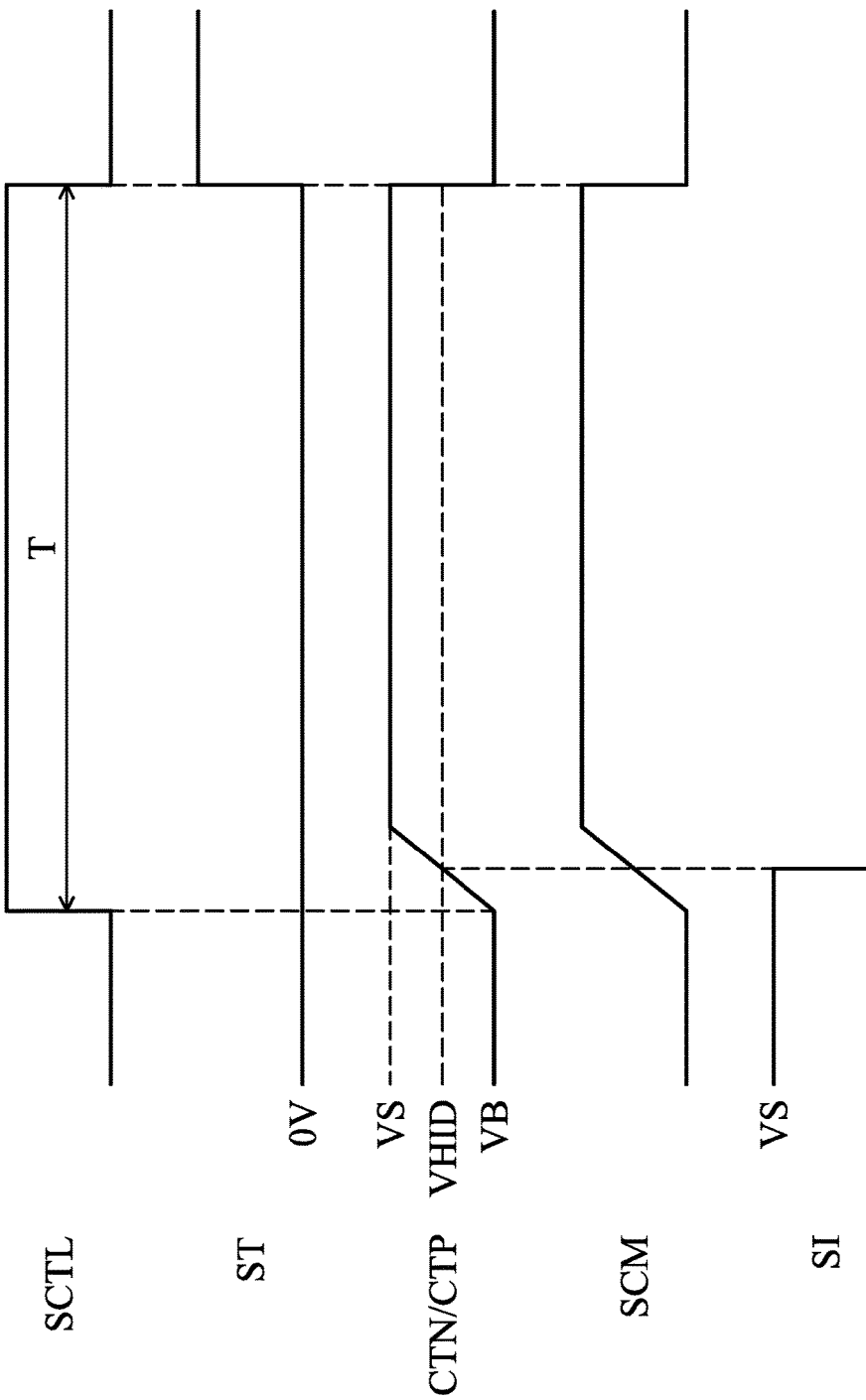
FIG. 6A is a timing diagram of the host system in FIG. 5 not electrically connected to the connection interface in accordance with an embodiment of the invention.

FIG. 6A is a timing diagram of the host system in FIG. 5 not electrically connected to the connection interface in accordance with an embodiment of the invention. Since the host system 50 is not electrically connected to the first connection interface 410 and the second connection interface 420, the coupling capacitor C is not electrically connected to the terminal impedance ZTM of the host system 50. In the beginning, the transmitting positive terminal CTP or the transmitting negative terminal CTN is biased to the bias voltage VB by the bias circuit 502.

As shown in FIG. 6A, when the control signal SCTL is converted from the low logic level to the high logic level, the current source 504 continuously sources the current I to the transmitting positive terminal CTP or the transmitting negative terminal CTN during the predetermined period T, such that the voltage of the transmitting positive terminal CTP or the transmitting negative terminal CTN is quickly charged from the bias voltage VB to the supply voltage VS. After comparing with the middle voltage VMID, the comparator 506 generates the comparison signal SCM in the high logic level. Once the predetermined period T ends, the trigger signal ST is converted from the low logic level to the high logic level, and the latch circuit 510 latches the inverse signal of the comparison signal SCM as the impedance signal SI. According to an embodiment of the invention, since the impedance signal SI is in the low logic level at this moment, the transmission control device 430 determines, according to the impedance signal SI being in the low logic level, that the host system 50 is not electrically connected to the first connection interface 410 or the second connection interface 420.

Figure 6B:
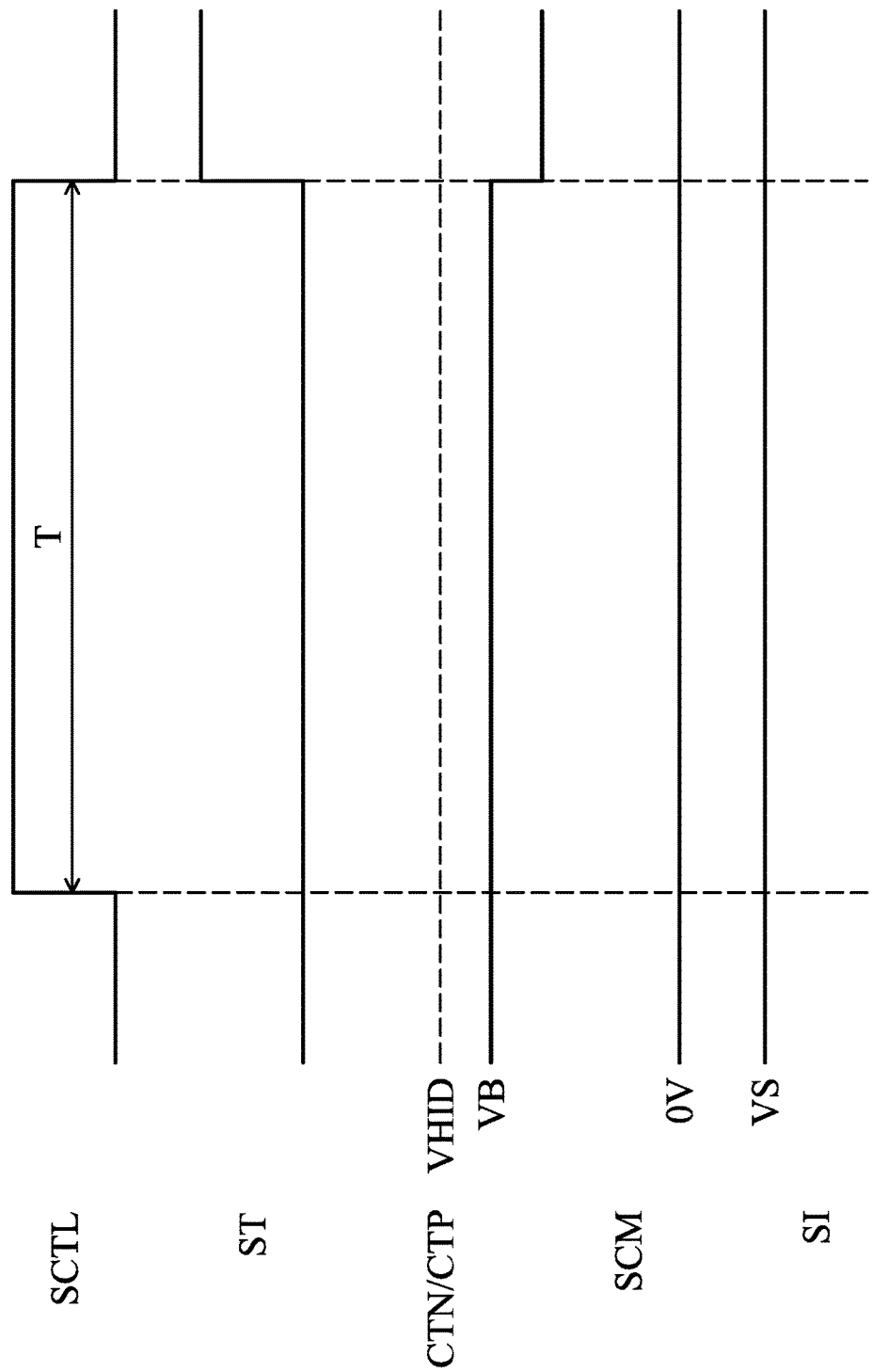
FIG. 6B is a timing diagram of the host system in FIG. 5 electrically connected to the connection interface in accordance with an embodiment of the invention.

FIG. 6B is a timing diagram of the host system in FIG. 5 electrically connected to the connection interface in accordance with an embodiment of the invention. Since the host system 50 is electrically connected to the first connection interface 410 or the second connection interface 420, the transmitting positive terminal CTP or the transmitting negative terminal CTN is electrically connected to the terminal impedance ZTM of the host system 50 with the coupling capacitor C. In the beginning, the transmitting positive terminal CTP or the transmitting negative terminal CTN is biased to the bias voltage VB by the bias circuit 502.

As shown in FIG. 6B, when the control signal SCTL is converted from the low logic level to the high logic level, the current source 504 continuously sources the current I to the transmitting positive terminal CTP or the transmitting negative terminal CTN during the predetermined period T. Since the coupling capacitor C is coupled to the terminal impedance ZTM, the voltage of the transmitting positive terminal CTP or the transmitting negative terminal CTN has not been charged to the middle voltage VMID during the predetermined period T. Once the predetermined period T ends, the comparison signal SCM remains in the low logic level. When the trigger signal ST is converted from the low logic level to the high logic level, the latch circuit 510 latches the inverse signal of the comparison signal SCM as the impedance signal SI. According to an embodiment of the invention, since the impedance signal SI is in the high logic level at this moment, the transmission control device 430 determines, according to the impedance signal SI being in the high logic level, that the host system 50 is electrically connected to the first connection interface 410 or the second connection interface 420.

According to other embodiments of the invention, the transmission control device 430 determines, according to the impedance signal SI being in the high logic level, that the host system 50 is not electrically connected to the first connection interface 410 or the second connection interface 420, and determines, according to the impedance signal SI being in the low logic level, that the host system 50 is electrically connected to the first connection interface 410 or the second connection interface 420. That is, the designer may define that the impedance signal SI being in different logic levels corresponds to the host system being in the respective connection states. According to an embodiment of the invention, the channel-detecting device 500 may detect, at different times, that the host system 50 is electrically connected to the first transmitting channel CT1 of the first connection interface 410 or the second transmitting channel CT2 of the second connection interface 420.

Figure 7:
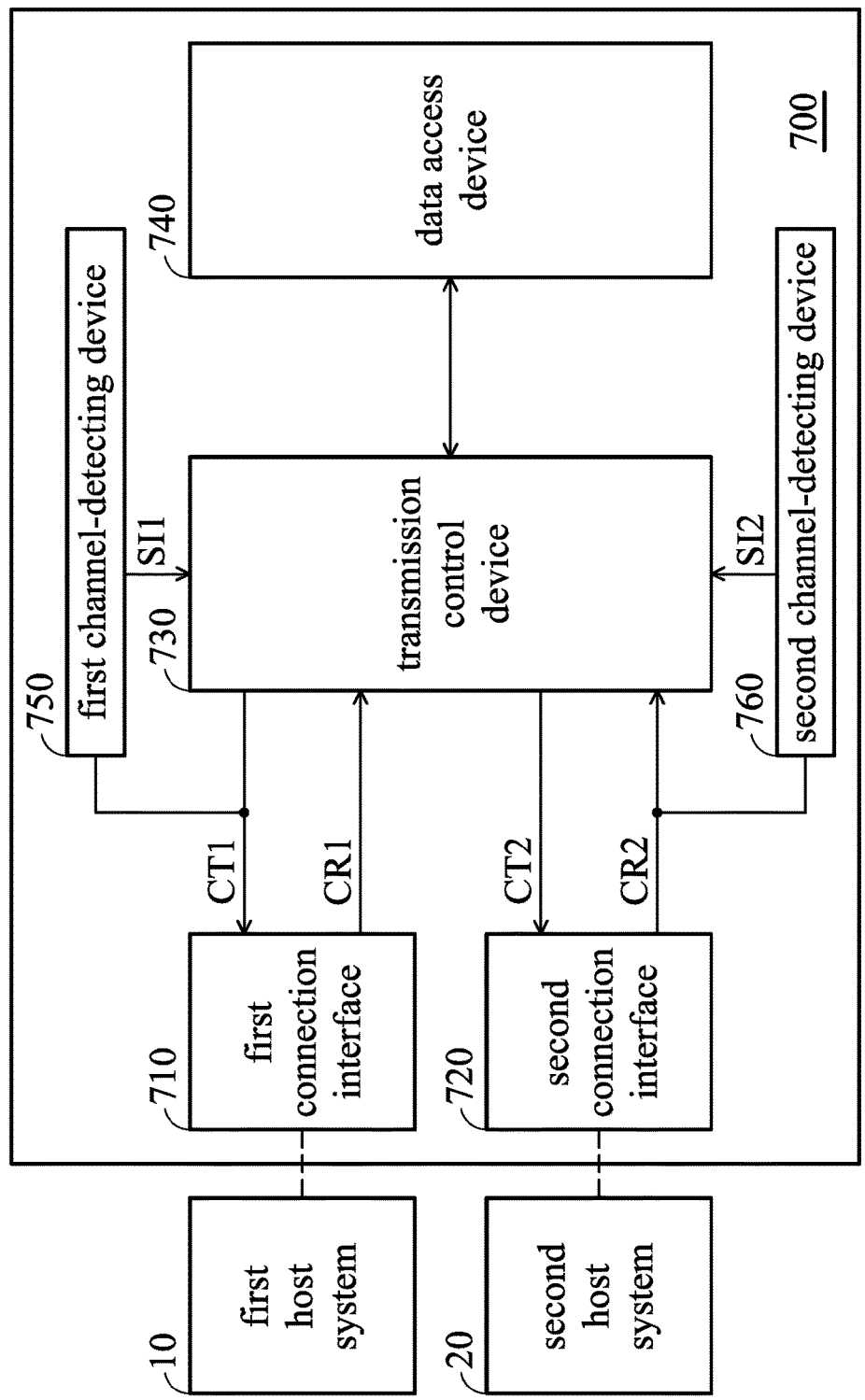
FIG. 7 is a block diagram of an electronic device in accordance with another embodiment of the invention.

FIG. 7 is a block diagram of an electronic device in accordance with another embodiment of the invention. Compared with the electronic device 400 in FIG. 4, the electronic device 700 not only includes the first connection interface 710, the second connection interface 720, the transmission control device 730, and the data access device 740, but also includes the first channel-detecting device 750 and the second channel-detecting device 760.

The first channel-detecting device 750, which is electrically connected to the first transmitting channel CT1, provides the first impedance signal SI1 for the transmission control device 730, according to whether the transmitting positive terminal or the transmitting negative terminal of the first transmitting channel CT1 is electrically connected to the terminal impedance ZTM of the first host system 10. The second channel-detecting device 760, which is electrically connected to the second transmitting channel CT2, provides the second impedance signal SI2 for the transmission control device 730, according to whether the transmitting positive terminal or the transmitting negative terminal of the second transmitting channel CT2 is electrically connected to the terminal impedance ZTM of the second host system 20. According to an embodiment of the invention, the first channel-detecting device 750 and the second channel-detecting device 760 may detect whether the first host system 10 and the second host system 20 are respectively coupled to the first connection interface 710 and the second connection interface 720 at the same time, or at different times, in which an embodiment of the first channel-detecting device 750 and the second channel-detecting device 760 is illustrated by the channel-detecting device 500 in FIG. 5.

According to an embodiment of the invention, the transmission control device 730 further includes a register (not shown in FIG. 7) configured to store the setting parameters. When the first host system 10 and the second host system 20 are respectively electrically connected to the first connection interface 710 and the second connection interface 720 at the same time, the transmission control device 730 operates in the auto mode, the priority mode, the maintenance mode, or a custom mode according to the setting parameters stored in the register, and the transmission control device 730 permits the first host system 10 and the second host system 20 to operate the corresponding operation functions on the data access device 740 according to different modes. According to an embodiment of the invention, the setting parameters can be written and stored in the form of firmware.

Figure 8:
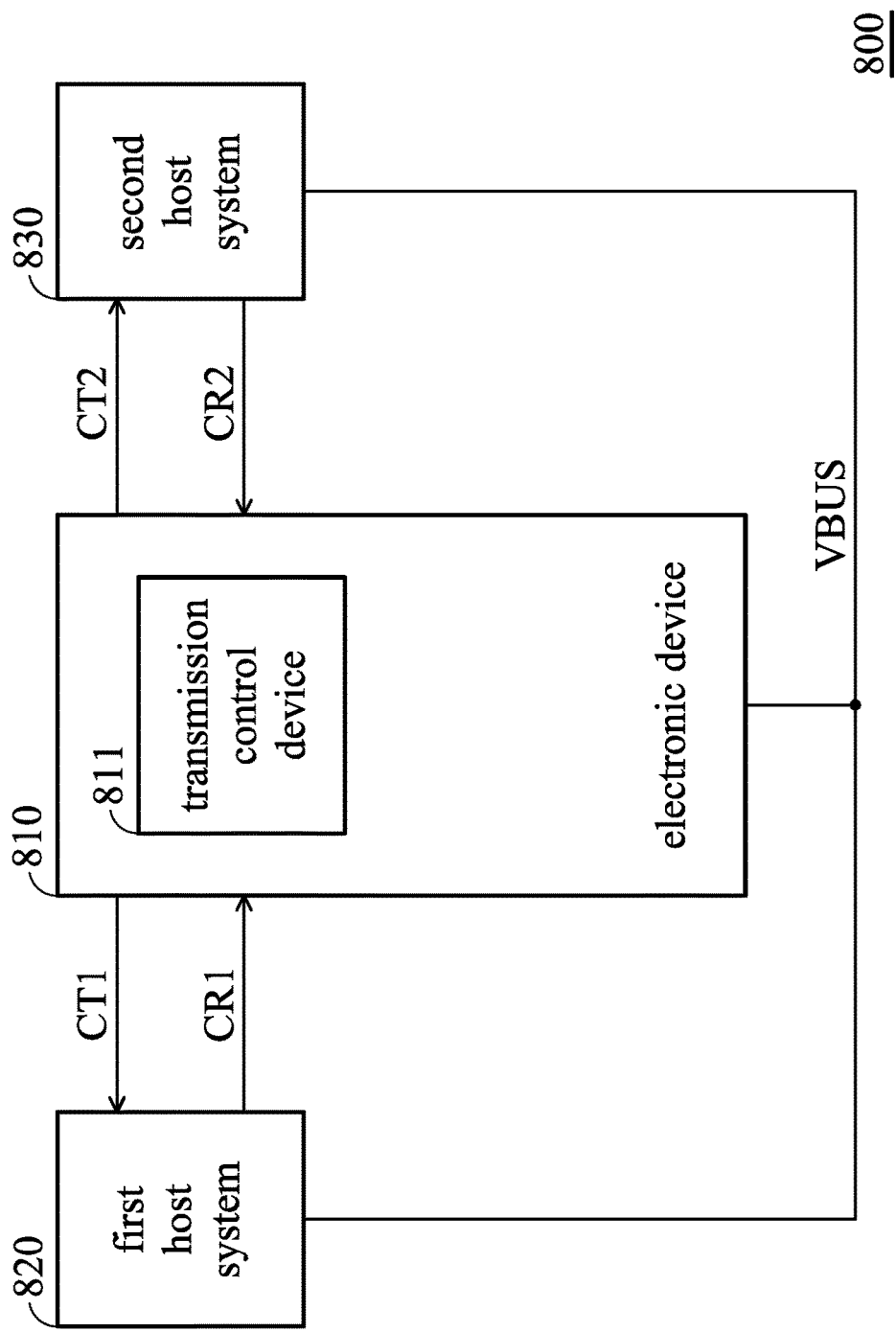
FIG. 8 is a block diagram of an electronic device in accordance with an embodiment of the invention.

FIG. 8 is a block diagram of an electronic device in accordance with an embodiment of the invention. As shown in FIG. 8, the electronic system 800 includes the electronic device 810, the first host system 820, and the second host system 830, in which the electronic device 810 includes the transmission control device 811, and the electronic device 810 and the transmission control device 811 are illustrated by all the embodiments in FIGS. 1-7 of the invention.

The electronic device 810 communicates with the first host system 820 by using the first transmitting channel CT1 and the first receiving channel CR1, and communicates with the second host system 830 by using the second transmitting channel CT2 and the second receiving channel CR2. In addition, the power bus VBUS of the electronic device 810, the first host system 820, and the second host system 830 is electrically connected together, so that both the first host system 820 and the second host system 830 may provide the electricity for the electronic device 810.

According to an embodiment of the invention, when the transmission control device 811 operates in the auto mode, the transmission control device 811 permits either the first host system 820 or the second host system 830 to operate the corresponding operation functions on the data access device of the electronic device 810 according to the order in which the first host system 820 and the second host system 830 are electrically connected to the electronic device 810. According to an embodiment of the invention, the operation functions include a multimedia access function, a data input/output interface function, and/or an information security certification function.

For instance, after the first host system 820 is electrically connected to the electronic device 810, the second host system 830 is then electrically connected to the electronic device 810. The electronic device 810 merely permits the first host system 820 to operate the corresponding operation functions on the electronic device 810, and ignores the request of the second host system 830. According to an embodiment of the invention, even though the electronic device 810 merely permits the first host system 820 to operate the corresponding operation functions, the second host system 830 is still capable of providing the electricity to the electronic device 810 and the first host system 820 since the power bus VBUS of each is coupled together.

According to another embodiment of the invention, when the transmission control device 811 operates in the priority mode, the setting parameters stored in a register (not shown) of the transmission control device 811 further includes a priority. According to an embodiment of the invention, the user may set the priority in the form of firmware. The transmission control device 811 preferentially permits the first host system 820 or the second host system 830 to operate the corresponding operation functions on the electronic device 810 in order of the priority.

For instance, it is assumed that the priority is set that the priority of the first transmitting channel CT1 and the first receiving channel CR1 higher than that of the second transmitting channel CT2 and the second receiving channel CR2. When the second host system 830 is electrically connected to the electronic device 810 and makes a request, the electronic device 810 does not respond. When the first host system 820 is electrically connected to the electronic device 810 and makes a request, the electronic device 810 immediately permits the first host system 820 to operate the corresponding operation functions.

According to yet another embodiment of the invention, when the transmission control device 811 operates in the maintenance mode, the transmission control device 811 merely permits the host system, which makes the transmission control device 811 enter the sleep mode, to operate the corresponding operation functions. For instance, when the transmission control device 811 operates in the maintenance mode, the first host system 820 makes the transmission control device 811 enter the sleep mode. Since the transmission control device 811 is operating in the maintenance mode, the transmission control device 811 ignores the wake-up request from the second host system 830, and merely grants the wake-up request from the first host system 820. That is, when operating in the maintenance mode, the transmission control device 811 merely grant the wake-up request from the host system which makes it enter the sleep mode.

According to yet another embodiment of the invention, when the transmission control device 811 operates in the custom mode, the user may program access logic in the setting parameters. The transmission control device 811 permits one or both of the first host system 820 and the second host system 830 to operate the corresponding operation functions on the electronic device 810 according to the access logic.

For instance, the transmission control device 811 controls the first host system 820 and the second host system 830, according to the access logic, to operate the corresponding operation functions on the electronic device 810 at the same time, or to operate the corresponding operation functions on the electronic device 810 by time-division multiplexing. In addition, the user may set the sequence or logic of the first host system 820 and the second host system 830 operating the corresponding operation functions on the electronic device 810 according to demand.

Figure 9:
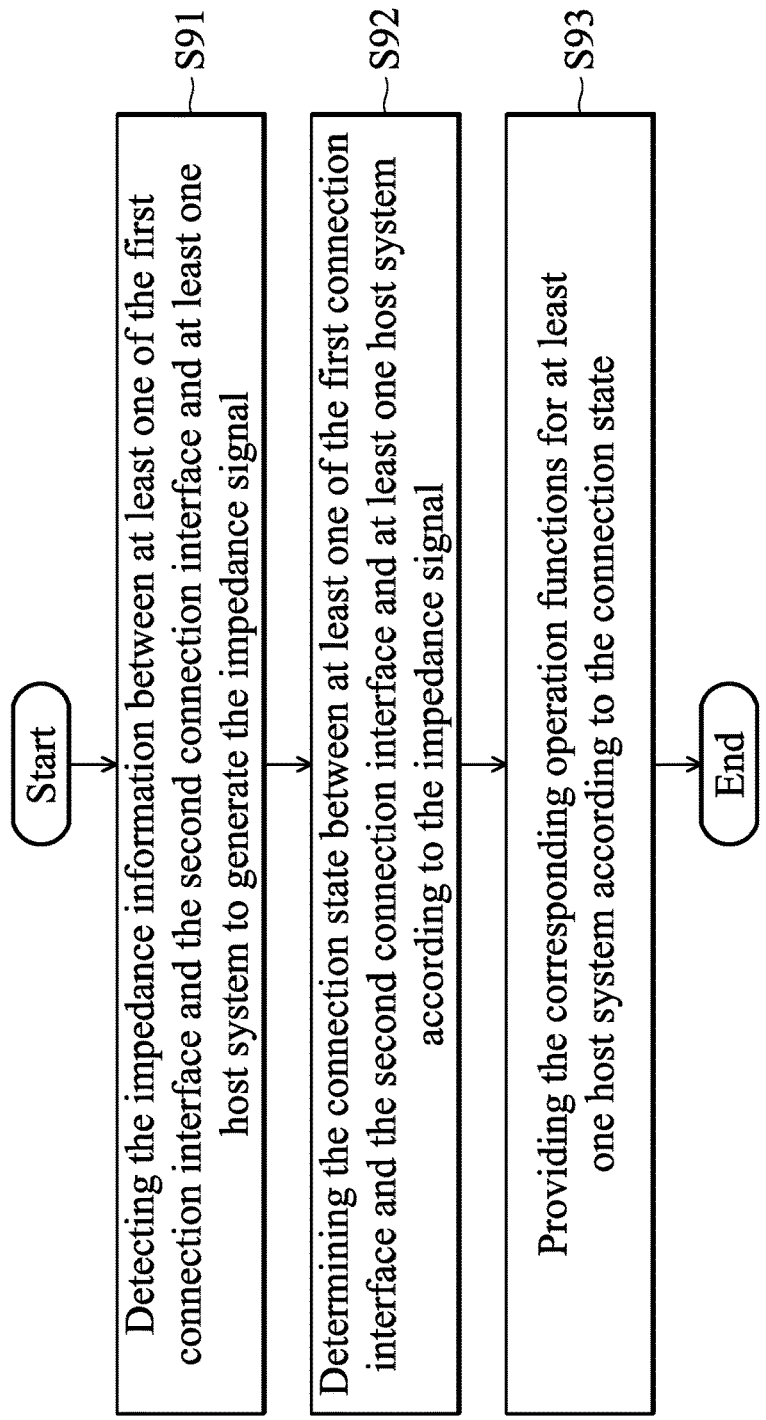
FIG. 9 is a flow chart of a method of controlling an electronic device in accordance with an embodiment of the invention.

FIG. 9 is a flow chart of a method of controlling an electronic device in accordance with an embodiment of the invention. Referring to FIGS. 3, 4, 7, and 9, the flow chart in FIG. 7 is adapted in the electronic device 300 in FIG. 3, the electronic device 400 in FIG. 4, and the electronic device 700 in FIG. 7. In Step S91, the channel-detecting device 450 detects the impedance information between one or both of the first connection interface 410 and the second connection interface 420 and at least one host system to generate an impedance signal SI. As shown in FIG. 7, the first channel-detecting device 750 and the second channel-detecting device 760 detects the impedance information between the first connection interface 710 and/or the second connection interface 720 and the first host system 10 and/or the second host system 20 to generate the first impedance signal SI1 and/or the second impedance signal SI2.

Then, in Step S92, the transmission control device 430 determines the connection state between one or both of the first connection interface 410 and the second connection interface 420 and at least one host system, according to the impedance signal SI. As shown in FIG. 7, the transmission control device 730 determines, according to the first impedance signal SI1 and the second impedance signal SI2, the connection state between the first connection interface 710 and/or the second connection interface 720 and the first host system 10 and/or the second host system 20. In Step S93, the transmission control device 430 provides, according to the first impedance signal SI1 and the second impedance signal SI2, the corresponding operation functions for the first connection interface 410 and/or the second connection interface 420 electrically connected to at least one host system.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
a first connection interface and a second connection interface, configured to be electrically connected to at least one host system;
a transmission control device, comprising a first communication channel and a second communication channel, wherein the first connection interface is electrically connected to the first communication channel, and the second connection interface is electrically connected to the second communication channel, wherein the transmission control device determines a connection state according to impedance information and provides corresponding operation functions for the at least one host system according to the connection state, wherein the connection state indicates whether one or both of the first connection interface and the second connection interface is electrically connected to the at least one host system, wherein the first communication channel comprises a first transmitting channel and a first receiving channel, and the second communication channel comprises a second transmitting channel and a second receiving channel, wherein the channel-detecting device generates an impedance signal according to at least one voltage variation generated by at least one terminal impedance of the at least one host system electrically connected to the first connection interface and the second connection interface, and the transmission control device determines the connection state according to the impedance signal;
a data access device, electrically connected to the transmission control device and configured to receive data transmitted by the at least one host system; and
a channel-detecting device, detecting the impedance information between one or both of the first connection interface and the second connection interface and the at least one host system, wherein the channel-detecting device generates the impedance information according to at least one impedance value of the at least one host system electrically connected to one or both of the first connection interface and the second connection interface, wherein, when the at least one host system is electrically connected to the first communication channel or the second communication channel, the first transmission channel or the second communication channel is electrically connected to at least one receiving channel of the at least one host system through a coupling capacitor, wherein the channel-detecting device comprises:
a bias circuit, biasing the first transmission channel or the second transmission channel to a bias voltage;

a current source, sourcing a current to the first transmitting channel or the second transmitting channel during a predetermined period according to a control signal;

a comparator, comparing the bias voltage with a middle voltage to generate a comparison signal; and a latch circuit, latching the comparison signal as the impedance signal once the predetermined period ends, wherein the transmission control device determines the connection state according to the impedance signal;

wherein, when the first transmitting channel or the second transmitting channel is electrically connected to the terminal impedance of the at least one host system, the bias voltage is charged by the current to exceed the middle voltage, wherein, when the first transmitting channel or the second transmitting channel is not electrically connected to the terminal impedance of the at least one host system, the bias voltage does not exceed the middle voltage during the predetermined period.

2. The electronic device of claim 1, wherein the corresponding operation functions provided by the transmission control device comprises at least one of a multimedia access function, a data input/output interface function and an information security certification function.

3. The electronic device of claim 1, wherein, when the transmission control device determines that the at least one host system is electrically connected to the first connection interface and the second connection interface according to the connection state, the transmission control device declares that the data access device that the at least one host system is electrically connected to is identical and provides the corresponding operation functions for the at least one host system, wherein the different operation functions provided by the transmission control device comprise different access priority for the at least one host system to access for the data access device.

4. The electronic device of claim 1, wherein the first communication channel further comprises a first power bus and the second communication channel further comprises a second power bus, wherein the transmission control device provides electricity for the data access device through one or both of the first power bus and the second power bus.

5. The electronic device of claim 1, wherein the channel-detecting device respectively detects the first transmitting channel and the second transmitting channel at different times.

6. The electronic device of claim 1, further comprising another channel-detecting device, wherein, when the channel-detecting device detects the impedance information of the first transmitting channel or the second transmitting channel, the other channel-detecting device detects the impedance information of the other of the first transmitting channel and the second transmitting channel at the same time.

7. The electronic device of claim 1, wherein the transmission control device comprises a register storing setting parameters, wherein, when a first host system is electrically connected to the first connection interface and the second host system is electrically connected to the second connection interface, the transmission control device operates, according to the setting parameters, in an auto mode, a priority mode, a maintenance mode, or a custom mode to permit one or both of the first host system and the second host system to operate the corresponding operation functions on the data access device.

8. The electronic device of claim 7, wherein, when the transmission control device operates in the auto mode, the transmission control device permits the first host system or the second host system to operate the corresponding operation functions on the data access device according to an order in which the first host system and the second host system are electrically connected to the first connection interface and the second connection interface.

9. The electronic device of claim 7, wherein, when the transmission control device operates in the priority mode, the setting parameters further comprise a priority, wherein the transmission control device preferentially permits the first host system or the second host system to operate the corresponding operation functions on the data access device in order of the priority.

10. The electronic device of claim 7, wherein, when the transmission control device operates in the maintenance mode, the transmission control device grants a sleep request from the first host system or the second host system to enter a sleep mode, wherein the transmission control device merely grants a wake-up request from the first host system or the second host system that made the sleep request and permits the first host system or the second host system that made the sleep request to operate the corresponding operation functions on the data access device.

11. The electronic device of claim 7, wherein, when the transmission control device operates in the custom mode, the setting parameters further comprise access logic, wherein the transmission control device permits one or both of the first host system and the second host system to operate the corresponding operation functions on the data access device according to the access logic.

12. The electronic device of claim 1, wherein the data access device is a USB rewritable non-volatile memory device, a USB multi-media device, a USB hard disc, a USB optic disk drive, a USB keyboard, a USB card reader, or a USB Wi-Fi adapter.

13. A transmission control device for controlling a data access device comprising:

a host interface, comprising a first communication channel and a second communication channel, wherein the first communication channel is electrically connected to a first connection interface and the second communication channel is electrically connected to a second connection interface, wherein the first connection interface and the second connection interface are electrically connected to at least one host system;

a device interface, configured to be electrically connected to the data access device; and a data-management circuit, electrically connected to the host interface and the device interface, wherein a channel-detecting device detects impedance information between one or both of the first connection interface and the second connection interface and the at least one host system, wherein the data-management circuit determines a connection state according to the impedance information and provides corresponding operation functions for the at least one host system according to the connection state, wherein the connection state indicates whether one or both of the first connection interface and the second connection interface is electrically connected to the at least one host system, wherein the first communication channel comprises a first transmitting channel and a first receiving channel, and the second communication channel comprises a second transmitting channel and a second receiving channel, wherein the channel-detecting device generates an impedance signal according to at least one voltage variation generated by at least one terminal impedance of the at least one host system electrically connected to the first connection interface and the second connection interface, and the transmission control device determines the connection state according to the impedance signal, wherein the channel-detecting device generates the impedance information according to at least one impedance value of the at least one host system electrically connected to one or both of the first connection interface and the second connection interface, wherein, when the at least one host system is electrically connected to the first communication channel or the second communication channel, the first transmission channel or the second communication channel is electrically connected to at least one receiving channel of the at least one host system through a coupling capacitor, wherein the channel-detecting device comprises:

a bias circuit, biasing the first transmission channel or the second transmission channel to a bias voltage;

a current source, sourcing a current to the first transmitting channel or the second transmitting channel during a predetermined period according to a control signal;

a comparator, comparing the bias voltage with a middle voltage to generate a comparison signal; and a latch circuit, latching the comparison signal as the impedance signal once the predetermined period ends, wherein the transmission control device determines the connection state according to the impedance signal;

wherein, when the first transmitting channel or the second transmitting channel is electrically connected to the terminal impedance of the at least one host system, the bias voltage is charged by the current to exceed the middle voltage, wherein, when the first transmitting channel or the second transmitting channel is not electrically connected to the terminal impedance of the at least one host system, the bias voltage does not exceed the middle voltage during the predetermined period.

14. The transmission control device of claim 13, wherein the corresponding operation functions provided by the data management device comprises at least one of a multimedia access function, a data input/output interface function and an information security certification function.

15. A control method for controlling an electronic device, wherein the electronic device comprises a first connection interface, a second connection interface, and a data access device, wherein the first connection interface and the second connection interface are configured to be electrically connected to at least one host system, the control method comprises:

generating an impedance signal according to at least one voltage variation generated by at least one terminal impedance of the at least one host system electrically connected to one or both of the first connection interface and the second connection interface, wherein the first connection interface is electrically connected to a first communication channel, and the second connection interface is electrically connected to a second communication channel, wherein the first communication channel comprises a first transmitting channel and a first receiving channel, and the second communication channel comprises a second transmitting channel and a second receiving channel, wherein, when the at least one host system is electrically connected to the first communication channel or the second communication channel, the first transmission channel or the second communication channel is electrically connected to at least one receiving channel of the at least one host system through a coupling capacitor, wherein the step of generating the impedance signal according to the at least one voltage variation generated by the at least one terminal impedance of the at least one host system electrically connected to one or both of the first connection interface and the second connection interface further comprises:

biasing the first transmission channel or the second transmission channel to a bias voltage;

sourcing a current to the first transmitting channel or the second transmitting channel during a predetermined period according to a control signal;

comparing the bias voltage with a middle voltage to generate a comparison signal; and latching the comparison signal as the impedance signal once the predetermined period ends;

determining a connection state of one or both of the first connection interface and the second connection interface and the at least one host system according to the impedance signal, wherein the connection state indicates whether one or both of the first connection interface and the second connection interface is electrically connected to the at least one host system, wherein, when the first transmitting channel or the second transmitting channel is electrically connected to the terminal impedance of the at least one host system, the bias voltage is charged by the current to exceed the middle voltage, wherein, when the first transmitting channel or the second transmitting channel is not electrically connected to the terminal impedance of the at least one host system, the bias voltage does not exceed the middle voltage during the predetermined period; and providing corresponding operation functions for the at least one host system according to the connection state.

16. The control method of claim 15, wherein the corresponding operation functions provided by the transmission control device comprises at least one of a multimedia access function, a data input/output interface function and an information security certification function.

* * * * *